US010405030B2

(12) United States Patent
Eyer

(10) Patent No.: US 10,405,030 B2
(45) Date of Patent: Sep. 3, 2019

(54) SERVER LOAD BALANCING FOR INTERACTIVE TELEVISION

(71) Applicant: Saturn Licensing LLC, New York, NY (US)

(72) Inventor: Mark Kenneth Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/521,034

(22) Filed: Oct. 22, 2014

(65) Prior Publication Data

US 2015/0046942 A1    Feb. 12, 2015

Related U.S. Application Data

(63) Continuation of application No. 13/043,170, filed on Mar. 8, 2011, now Pat. No. 8,893,210.

(Continued)

(51) Int. Cl.
*H04N 7/173* (2011.01)
*H04N 21/435* (2011.01)
(Continued)

(52) U.S. Cl.
CPC ....... *H04N 21/435* (2013.01); *H04N 21/4622* (2013.01); *H04N 21/6175* (2013.01);
(Continued)

(58) Field of Classification Search
CPC . H04N 7/173; H04N 7/17309; H04N 7/17318
(Continued)

(56) References Cited

U.S. PATENT DOCUMENTS

| 4,342,083 A | * | 7/1982 | Freedman | G06F 11/00 709/253 |
| 5,315,126 A | * | 5/1994 | Field | H01J 1/34 257/10 |

(Continued)

FOREIGN PATENT DOCUMENTS

| EP | 2 514 204 | 10/2012 |
| GB | 2 406 676 A | 4/2005 |

(Continued)

OTHER PUBLICATIONS

Albrecht, "TV Multi-Taskers Can Get Jacked," The GigaOm Network, Mar. 15, 2008.

(Continued)

*Primary Examiner* — Annan Q Shang
(74) *Attorney, Agent, or Firm* — Oblon, McClelland, Maier & Neustadt, L.L.P.

(57) ABSTRACT

A method consistent with certain implementations involves receiving a triggered declarative object (TDO) to a digital television receiver device that carries out a programmed routine when activated; receiving a trigger object associated with the TDO to the digital television receiver device; receiving a back-off parameter that represents a time interval during which the trigger is to initiate an operation; the digital television receiver device having a processor that establishes a random time within the time interval of the backoff parameter in which the TDO is activated; and the digital television receiver device processor initiating the operation at the random time. This abstract is not to be considered limiting, since other embodiments may deviate from the features described in this abstract.

16 Claims, 6 Drawing Sheets

Related U.S. Application Data

(60) Provisional application No. 61/375,410, filed on Aug. 20, 2010.

(51) Int. Cl.
| | |
|---|---|
| *H04N 21/654* | (2011.01) |
| *H04N 21/61* | (2011.01) |
| *H04N 21/81* | (2011.01) |
| *H04N 21/8547* | (2011.01) |
| *H04N 21/858* | (2011.01) |
| *H04N 21/462* | (2011.01) |
| *H04N 21/643* | (2011.01) |

(52) U.S. Cl.
CPC ..... *H04N 21/64322* (2013.01); *H04N 21/654* (2013.01); *H04N 21/8166* (2013.01); *H04N 21/8173* (2013.01); *H04N 21/858* (2013.01); *H04N 21/8547* (2013.01)

(58) Field of Classification Search
USPC .......... 725/36, 54, 131–139, 139–142; 709/217–232
See application file for complete search history.

(56) References Cited

U.S. PATENT DOCUMENTS

| | | | | |
|---|---|---|---|---|
| 5,450,612 | A * | 9/1995 | Chanroo | H04W 88/187 340/7.2 |
| 5,774,388 | A * | 6/1998 | Joanblanq | G06F 17/142 382/280 |
| 5,784,557 | A * | 7/1998 | Oprescu | 709/220 |
| 5,787,483 | A | 7/1998 | Jam et al. | |
| 6,047,052 | A | 4/2000 | Sakai et al. | |
| 6,237,146 | B1 * | 5/2001 | Richards | H04N 7/17309 348/E7.07 |
| 6,240,555 | B1 * | 5/2001 | Shoff | H04N 5/44543 348/E5.104 |
| 6,330,719 | B1 | 12/2001 | Zigmond et al. | |
| 6,389,034 | B1 * | 5/2002 | Guo | H04B 7/264 370/441 |
| 6,463,048 | B1 * | 10/2002 | Garyantes | H04B 1/709 370/342 |
| 6,571,392 | B1 * | 5/2003 | Zigmond | H04H 20/93 348/E5.002 |
| 6,604,242 | B1 | 8/2003 | Weinstein et al. | |
| 6,732,165 | B1 * | 5/2004 | Jennings, III | 709/220 |
| 6,750,781 | B1 * | 6/2004 | Kim | H02J 13/0082 340/12.32 |
| 6,944,881 | B1 * | 9/2005 | Vogel | H04L 12/2801 375/222 |
| 6,965,913 | B2 | 11/2005 | Levitan | |
| 6,966,066 | B1 | 11/2005 | Zigmond et al. | |
| 7,284,202 | B1 | 10/2007 | Zenith | |
| 7,421,741 | B2 | 9/2008 | Phillips, II et al. | |
| 7,437,750 | B1 * | 10/2008 | Sonoda | H04N 7/17327 348/E7.061 |
| 7,580,346 | B2 * | 8/2009 | Azenkot | H04N 7/17309 370/208 |
| 7,584,491 | B2 * | 9/2009 | Bruckner | H04N 7/17318 709/213 |
| 7,600,241 | B2 | 10/2009 | Zigmond et al. | |
| 7,676,822 | B2 * | 3/2010 | Forler | H04N 5/44513 348/563 |
| 7,733,913 | B1 * | 6/2010 | Cheung | H04L 45/00 370/474 |
| 7,746,773 | B2 * | 6/2010 | Gerdes et al. | 370/230 |
| 7,783,776 | B2 | 8/2010 | Nimour | |
| 7,889,964 | B1 | 2/2011 | Barton et al. | |
| 7,912,975 | B2 * | 3/2011 | Grossner et al. | 709/232 |
| 8,072,950 | B2 * | 12/2011 | Fan et al. | 370/338 |
| 8,196,165 | B2 * | 6/2012 | Schlack | G08B 27/008 725/33 |
| 8,266,644 | B2 | 9/2012 | Randolph et al. | |
| 8,595,783 | B2 | 11/2013 | Dewa | |
| 8,601,089 | B2 * | 12/2013 | Bowman | H04L 29/06027 709/217 |
| 8,705,933 | B2 | 4/2014 | Eyer | |
| 8,839,338 | B2 | 9/2014 | Eyer | |
| 8,842,974 | B2 | 9/2014 | Kitazato | |
| 8,863,171 | B2 | 10/2014 | Blanchard et al. | |
| 8,893,210 | B2 | 11/2014 | Eyer | |
| 2002/0162118 | A1 | 10/2002 | Levy et al. | |
| 2003/0018745 | A1 | 1/2003 | McGowen et al. | |
| 2003/0037132 | A1 | 2/2003 | Abdollahi et al. | |
| 2003/0169885 | A1 * | 9/2003 | Rinaldi | H04H 20/82 380/278 |
| 2004/0022278 | A1 | 2/2004 | Thomas et al. | |
| 2004/0031058 | A1 | 2/2004 | Reisman | |
| 2004/0068570 | A1 | 4/2004 | Haller | |
| 2004/0111756 | A1 | 6/2004 | Stuckman et al. | |
| 2004/0139475 | A1 * | 7/2004 | Zenoni | H04N 5/445 725/113 |
| 2004/0234018 | A1 * | 11/2004 | Ram | H04B 7/18528 375/354 |
| 2005/0015796 | A1 | 1/2005 | Bruckner et al. | |
| 2005/0138667 | A1 | 6/2005 | Delpuch | |
| 2005/0148296 | A1 | 7/2005 | Kopra et al. | |
| 2005/0243059 | A1 * | 11/2005 | Morris | G06F 1/3203 345/158 |
| 2005/0262539 | A1 | 11/2005 | Barton et al. | |
| 2005/0273832 | A1 | 12/2005 | Zigmond et al. | |
| 2005/0278747 | A1 | 12/2005 | Barton et al. | |
| 2006/0010470 | A1 | 1/2006 | Kurosaki et al. | |
| 2006/0026162 | A1 | 2/2006 | Salmonsen et al. | |
| 2006/0031249 | A1 * | 2/2006 | Peden | H04L 12/1877 |
| 2006/0242692 | A1 | 10/2006 | Thione et al. | |
| 2007/0028261 | A1 | 2/2007 | Bouilloux-Lafont | |
| 2007/0061724 | A1 | 3/2007 | Slothouber et al. | |
| 2007/0283026 | A1 * | 12/2007 | Lohmar | H04L 12/1868 709/229 |
| 2008/0082922 | A1 | 4/2008 | Biniak et al. | |
| 2008/0126477 | A1 | 5/2008 | Kim | |
| 2008/0133728 | A1 | 6/2008 | Nimour | |
| 2008/0151749 | A1 | 6/2008 | Kawamura | |
| 2008/0165865 | A1 * | 7/2008 | Bar-Ness | G05B 13/024 375/241 |
| 2008/0172585 | A1 * | 7/2008 | Hurley | G01R 31/318385 714/718 |
| 2008/0212582 | A1 * | 9/2008 | Zwart | H04L 1/1692 370/390 |
| 2008/0247543 | A1 | 10/2008 | Mick et al. | |
| 2009/0103501 | A1 * | 4/2009 | Farrag | H04W 74/02 370/337 |
| 2009/0158315 | A1 * | 6/2009 | Bendall | H04N 7/185 725/32 |
| 2009/0320066 | A1 | 12/2009 | Soldan et al. | |
| 2010/0080529 | A1 | 4/2010 | Barton et al. | |
| 2010/0153994 | A1 * | 6/2010 | Alexander | H04N 7/163 725/35 |
| 2010/0180007 | A1 | 7/2010 | Suh et al. | |
| 2010/0217885 | A1 * | 8/2010 | Acharya | H04L 12/185 709/231 |
| 2011/0088075 | A1 | 4/2011 | Ever | |
| 2011/0126107 | A1 | 5/2011 | Barton et al. | |
| 2011/0135276 | A1 | 6/2011 | Barton et al. | |
| 2011/0200300 | A1 | 8/2011 | Barton et al. | |
| 2011/0243536 | A1 | 10/2011 | Eyer | |
| 2011/0246488 | A1 | 10/2011 | Eyer | |
| 2011/0247028 | A1 | 10/2011 | Eyer | |
| 2011/0298981 | A1 | 12/2011 | Eyer | |
| 2011/0299827 | A1 | 12/2011 | Eyer | |
| 2011/0302599 | A1 | 12/2011 | Eyer | |
| 2011/0302611 | A1 | 12/2011 | Eyer | |
| 2012/0011550 | A1 | 1/2012 | Holland | |
| 2012/0027383 | A1 | 2/2012 | Barton et al. | |
| 2012/0044418 | A1 | 2/2012 | Eyer | |
| 2012/0047531 | A1 | 2/2012 | Eyer | |
| 2012/0050619 | A1 | 3/2012 | Kitazato et al. | |
| 2012/0050620 | A1 | 3/2012 | Kitazato | |
| 2012/0054214 | A1 | 3/2012 | Yamagishi et al. | |

(56) References Cited

U.S. PATENT DOCUMENTS

| | | |
|---|---|---|
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0084802 A1 | 4/2012 | Kitazato |
| 2012/0084824 A1 | 4/2012 | Kitazato |
| 2012/0084829 A1 | 4/2012 | Kitazato |
| 2012/0114301 A1 | 5/2012 | Barton et al. |
| 2012/0174147 A1* | 7/2012 | Lohmar .............. H04L 12/1868 725/24 |
| 2012/0185888 A1 | 7/2012 | Eyer et al. |
| 2012/0213494 A1 | 8/2012 | Barton et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0024894 A1 | 1/2013 | Eyer |
| 2013/0024897 A1 | 1/2013 | Eyer |
| 2013/0031569 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |
| 2013/0198768 A1 | 8/2013 | Kitazato |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0215327 A1 | 8/2013 | Kitazato et al. |
| 2013/0243393 A1 | 9/2013 | Barton et al. |
| 2013/0250173 A1 | 9/2013 | Eyer |
| 2013/0254824 A1 | 9/2013 | Eyer |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Eyer |
| 2013/0291049 A1 | 10/2013 | Kitazato |
| 2013/0340007 A1 | 12/2013 | Eyer |
| 2014/0013347 A1 | 1/2014 | Yamagishi |
| 2014/0013379 A1 | 1/2014 | Kitazato et al. |
| 2014/0020038 A1 | 1/2014 | Dewa |
| 2014/0020042 A1 | 1/2014 | Eyer |
| 2014/0040965 A1 | 2/2014 | Kitazato et al. |
| 2014/0040968 A1 | 2/2014 | Kitazato et al. |
| 2014/0043540 A1 | 2/2014 | Kitazato et al. |
| 2014/0053174 A1 | 2/2014 | Eyer et al. |
| 2014/0067922 A1 | 3/2014 | Yamagishi et al. |
| 2014/0099078 A1 | 4/2014 | Kitahara et al. |
| 2014/0122528 A1 | 5/2014 | Yamagishi |
| 2014/0137153 A1 | 5/2014 | Fay et al. |
| 2014/0137165 A1 | 5/2014 | Yamagishi |
| 2014/0150040 A1 | 5/2014 | Kitahara et al. |
| 2014/0157304 A1 | 6/2014 | Fay et al. |
| 2014/0173661 A1 | 6/2014 | Yamagishi |
| 2014/0186008 A1 | 7/2014 | Eyer |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Eyer et al. |

FOREIGN PATENT DOCUMENTS

| | | |
|---|---|---|
| JP | H11-155141 | 6/1999 |
| JP | 2005-12545 A | 1/2005 |
| JP | 2006-50237 A | 2/2006 |
| JP | 2006-109218 A | 4/2006 |
| JP | 2006-113698 | 4/2006 |
| JP | 2007-521769 | 8/2007 |
| JP | 2008-529373 A | 7/2008 |
| WO | WO 01/01232 A1 | 1/2001 |
| WO | WO 2002/045406 | 6/2002 |
| WO | WO 2009/057050 | 5/2009 |

OTHER PUBLICATIONS

Anonymous, "TiVo Series3 HD DVR (32 HD Hours) Product Summary," CNET Editor's Review, Sep. 11, 2006 (Updated Sep. 4, 2008).

Freeman, "Implementing the ATSC PSIP Standard," Softprose Inc., Oct. 26, 2006.

Extended European Search Report dated Feb. 3, 2014 in Patent Application No. 11818492.8.

Huang et al., "Performance Analysis of Data Placement and Retrieval Schemes for Video Servers Based on Response Time Guaranteed," IEEE Explore, Sep. 1997.

Shuck, "Roundbox's Mobile TV Widgets Marry Mobile TV, Web," Broadcast Engineering, May 5, 2009.

Soares, "Interactive Television in Brazil: System Software and the Digital Divide," Telemidia Lab Catholic University of Rio de Janeiro, 2007.

Verizon, "Verizon Launches New Wave of Interactive Features for FIOS TV Customers in North Texas," Verizon News Release, Oct. 24, 2008.

Verizon, "Verizon Ushers in a New Era of Television Entertainment With the Debut of FIOS TV in Allentown, PA," Verizon PR Newswire, Nov. 4, 2009.

Williams et al., "Virtual Personalized Channels: Video Conducting of Future TV Broadcasting," EWIMT 2005: Second European Workshop on the Integration of Knowledge, Semantic and Digital Media Technologies, Dec. 2005.

U.S. Appl. No. 13/930,814, filed Jun. 28, 2013, Fay.
U.S. Appl. No. 13/930,880, filed Jun. 28, 2013, Fay et al.
U.S. Appl. No. 13/934,549, filed Jul. 3, 2013, Fay et al.
U.S. Appl. No. 13/934,615, filed Jul. 3, 2013, Eyer.
U.S. Appl. No. 13/955,130, filed Jul. 31, 2013, Fay.
U.S. Appl. No. 14/275,231, filed May 12, 2014, Eyer.
U.S. Appl. No. 14/295,695, filed Jun. 4, 2014, Eyer.
U.S. Appl. No. 14/457,290, filed Aug. 12, 2014, Eyer.
U.S. Appl. No. 14/458,310, filed Aug. 13, 2014, Eyer.
U.S. Appl. No. 14/490,263, filed Sep. 18, 2014, Blanchard et al.
U.S. Appl. No. 14/493,661, filed Sep. 23, 2014, Yamagishi.
U.S. Appl. No. 14/493,721, filed Sep. 23, 2014, Kitazato.
U.S. Appl. No. 14/504,455, filed Oct. 2, 2014, Fay.
U.S. Appl. No. 14/504,984, filed Oct. 2, 2014, Eyer.
U.S. Appl. No. 14/509,200, filed Oct. 8, 2014, Eyer.
U.S. Appl. No. 14/509,166, filed Oct. 8, 2014, Kitazato.
U.S. Appl. No. 14/512,761, filed Oct. 13, 2014, Fay.
U.S. Appl. No. 14/512,776, filed Oct. 13, 2014, Kitazato.

Office Action dated Jun. 27, 2013, in Korean Patent Application No. 10-2011-70008528 with English translation.

Office Action dated Aug. 14, 2015, in Chinese Patent Application No. 201180038958.4 with English translation.

International Search Report dated May 20, 2011 in PCT/US2011/029055 filed Mar. 18, 2011.

European Office Action dated Jan. 27, 2016, in European Patent Application No. 11818492.8-1908 /2606642.

European Office Action dated Apr. 24, 2015, in European Patent Application No. 11 818 492.8-1908.

Korean Office Action dated Jul. 20, 2017 in Korean Patent Appitcation No. 10-2013-7004231 (with English translation).

International Search Report dated Sep. 13, 2011 in PCT/JP2011/068833 (with English translation), citing documents AT, AU, AV and BB therein, 6 pages.

Extended European Search Report dated Mar. 5, 2014 in European Patent Application No. 11821581.3, citing documents BO and AZ therein, 11 pages.

(56) References Cited

OTHER PUBLICATIONS

Steven Morris, et al., "Interactive TV Standards: A Guide to MHP, OCAP, and JavaTV (Chapters 3 and 4)". Interactive TV Standards, XP002394425, Jan. 1, 2005, pp. 41-88.

\* cited by examiner

SERVER LOAD BALANCING FOR INTERACTIVE TELEVISION

CROSS-REFERENCE TO RELATED APPLICATIONS

This application is a continuation application of, and claims the benefit of priority under 35 U.S.C. § 120 from, U.S. application Ser. No. 13/043,170, filed Mar. 8, 2011, which is a non-provisional application of U.S. Provisional Patent Application Ser. No. 61/375,410, filed Aug. 20, 2010. The entire contents of each of the above applications are incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

A triggerable declarative object (TDO) is a downloadable object created by a content creator or service provider, which includes declarative content (text, descriptive markup, graphics, scripts, and audio) whose function and behavior is tied in some way to digital television programming that it accompanies. Standards defining TDOs specify associated available behaviors, appearance, trigger actions, and transport methods for content and metadata.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
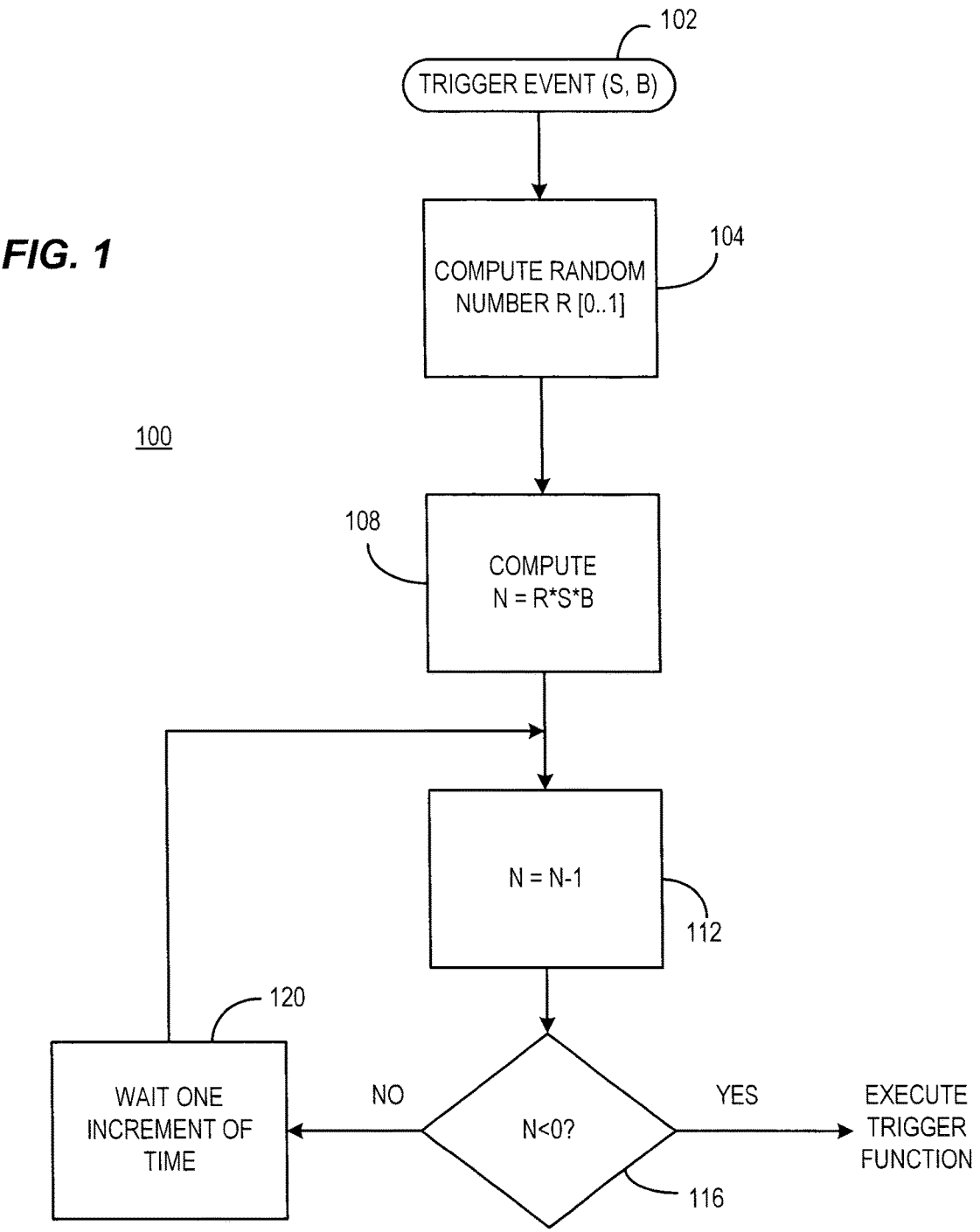
FIG. 1 is an example of a flow chart for a process of computing random execution timing for a TDO in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a script, a program module, a shared library/dynamic load library, program module and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide. In this discussion, the use of the term "Program" is also generally consistent with that of the MPEG-2 Systems standard (ISO/IEC 13818-1). An MPEG-2 Program has the associated Elementary Stream components, such as for example one video Elementary Stream and one or more audio Elementary Streams.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For purposes of this document, the terms "Synchronized Widget" and "Triggered Declarative Object" are used synonymously and interchangeably. Use of this term and related terms are generally as defined and explained in detail in U.S. patent application Ser. No. 12/959,529 filed Dec. 3, 2010 entitled "Announcement of Triggered Declarative Objects" to Blanchard et al. which is hereby incorporated by reference. However, this application defines the content of the TDO and trigger somewhat more rigorously than is required since many attributes defined as being a part of a TDO could be situated in the trigger or vice versa or not present at all depending upon the function and triggering of a particular TDO. As used herein, the term Triggered Declarative Object or Triggerable Declarative Object (TDO) is a downloadable software object created by a content creator or service provider. Generally, such objects have declarative content (text, descriptive markup, graphics, scripts, and audio) whose function and behavior is tied in some way to the television programming that it accompanies. Note that a TDO is generally considered as "declarative" content to distinguish it from "executable" content such as a Java applet or an application that runs on an operating system platform. While considered declarative, a TDO supports a scripting language that is an object-oriented programming language. The TDO, in examples shown herein, are received from a service provider in advance of a time defined by a trigger object (as explained below) so that the TDO is available when the trigger arrives. Moreover, an explicit trigger signal may not be necessary and a TDO may be self-triggering or triggered by some action other than receipt of a trigger signal. Various standards bodies may define associated available behaviors, appearance, trigger actions, and transport methods for content and metadata for a TDO. Additionally, requirements regarding timing accuracy of TDO behaviors relative to audio/video are expected to be defined by standards bodies.

As used herein a "trigger" or "announcement trigger" is a data object, bound to a particular program segment that references a specific TDO, by means such as a file name or identifier for an object that is expected to have already been downloaded. Requirements regarding timing accuracy of triggers relative to audio/video may also eventually be specified by standards bodies. Certain TDOs will only make sense in conjunction with a certain program. An example is a TDO that collects viewer response data, such as voting on a game show or contest.

With regard to the exact nature of TDOs and triggers, certain information can be provided within either the TDO or within the trigger without limitation. However, the two objects operate cooperatively to produce a desired function when the TDO is executed in a digital television receiver device's internal processor.

The present subject matter generally pertains to the field of advanced, interactive digital television systems. In systems such as those envisioned for advanced television systems in the United States, the user's experience of watching TV programming is enhanced with interactive elements that are synchronized with the content of the program material. New standards are expected to define the platform in the receiving device that supports the execution of scripted behaviors. The system is built on the TDO concept described above.

Some types of content and metadata in example advanced interactive television system are delivered within the digital program multiplex, while other types are made available via an advanced receiver's Internet connection. In some usage scenarios, it is possible for a large number of digital television receiver devices to be triggered to access data from a service provider's server at the same instant of time. Such a spike in demand can overload the server's capacity to respond. One example is if a trigger causes a TDO residing on many advanced digital television receiver devices to each access a particular Internet server approximately simultaneously. In the extreme, this could overload the service at the particular server to the point of failure. Less extreme forms of abnormal behavior due to the overload could include delayed or missing responses in some receivers.

The present subject matter relates to a mechanism for defining a signaling method and receiver response that acts to smooth out this peak in demand. This can be accomplished by signaling a time period starting at the initial trigger point or some point in time defined by the trigger. The receiver response to the time period is to create a random delay period between zero and the indicated time period window. Following the delay period, the desired access to a server (e.g., referenced via a URL or URI) can be made. The net result is that the peak in demand on the server is smoothed out to a uniform level for the duration of the signaled time period. The random delay period can be pre-programmed into the receiver device or can be in accord with an algorithm carried within a TDO script.

Many advanced broadcast digital television receiver devices (e.g., television sets, set top boxes, set back boxes, etc.) will be Internet-enabled, because a significant amount of extra functionality is enabled by Internet access. For example, TDOs may be made available from a service provider's server. At the time the availability of the TDO is first signaled in the broadcast stream, a large number of receivers may wish to access the server to retrieve the file(s). This peak in demand can overload the server's capacity to service all clients in a timely manner.

In accord with certain implementations consistent with embodiments of the invention, parameters representing a time interval for a random backoff algorithm are delivered along with the Internet URL for an object (file). The response in the receiver is to derive a random interval between zero time delay and the maximum time delay defined by a signaled time interval, wait that amount of time, and then perform the Internet access. This has the effect of creating a more uniformly distributed load on the server, thus reducing the implementation cost of the server infrastructure. The backoff parameters are most preferably delivered in the trigger object, but may alternatively be delivered via the TDO itself.

In accord with other implementations consistent with embodiments of the invention, an action initiated by the script in the TDO itself may involve access to a server on the Internet. As before, since many TDOs may be present in the system all wishing access to the same server at the same moment, a peak in demand is created. As before, a randomized backoff approach is helpful.

There are a number of ways to represent a variable time interval, depending on the desired granularity. Following are non-limiting specific examples of ways to represent the window in which the variable time interval resides:

1. A 13-bit unsigned integer can be used to representing the time interval in milliseconds. The maximum time period in this case would be 8.192 seconds.

2. A 10-bit unsigned integer can be used to represent the time interval in units of 10 msec. The maximum time period would be 10.24 seconds.

3. An 8-bit unsigned integer can be used to represent the time interval in units of 40 msec. The maximum time period would be 10.20 seconds.

4. An integer of specified number of bits can be used to represent the time interval in units specified in a second parameter which is either specified in the signaling or predefined.

In the receiver, the specific algorithm used to derive a random backoff time within the specified interval is immaterial and can be as simple or complex as desired. But, it should be noted that for purposes of the present discussion the term "random" is used to incorporate both purely random events as well as pseudorandom events. Generally, a random number generator (pseudorandom number generator) is used to compute a random delay time for trigger execution of a particular TDO in a particular digital television receiver device (e.g., a television set or a set-top box, etc.)

A number unique to the specific unit should preferably be used as the seed for the random number generating algorithm to assure that all receivers do not generate the same result. Non-limiting examples of numbers usable for this purpose include the MAC address of the network interface, the serial number of the unit, the assigned IP address, etc.

In certain implementations, as mentioned, the time interval may be specified in a two-part format, with one field representing the unit of time, and the second field representing the units. An example of this is depicted in the TABLE 1 below.

TABLE 1

Two-part Backoff Time

| Syntax | No. of Bits | Format |
|---|---|---|
| . . . | . . . | . . . |
| time_unit | 2 | uimsbf |
| backoff_interval | 10 | uimsbf |
| . . . | . . . | . . . |

In this non-limiting example, the time_unit parameter represents a unit of time represented in TABLE 2 below. The backoff_interval represents the number of such units of time that are used as the maximum duration of the trigger interval. In other examples, the number of bits used to represent the backoff_interval or the time_unit can be varied, and the meaning of the time_unit in TABLE 2 can be any other set of times as desired for a particular implementation.

TABLE 2

Time Unit

| time_unit | Meaning |
|---|---|
| 0 | 10 msec. |
| 1 | 100 msec. |
| 2 | 1 sec. |
| 3 | 10 sec. |

This example scheme allows the signaling of intervals of up to 10.23 seconds in 10 msec. granularity, or up to 170.5 minutes at one-second granularity. Those skilled in the art will appreciate upon consideration of these teachings that many alternatives are possible.

Referring now to FIG. 1 an example process 100 for a "Backoff Algorithm" implemented in a digital television receiver device is depicted. In this implementation, upon reception of a trigger event at 102, the processor within a digital television receiver device computes a random number, R, in the range zero to 1 (in this example) at 104. In this example, R is a floating point number, but other implementations could use integers. As an example of the use of integer arithmetic, a random 16-bit number can be computed. When this number is multiplied by S (the time_unit) and B (the backoff_interval), the result can be divided by $2^{16}$ by simply shifting the result to the right by 16 bit positions. The result is the number of milliseconds or other time units that the receiver needs to wait before executing the trigger operation. In other examples, the value of S can be coded and communicated as a number of predefined units such as 10 ms intervals so that a coded value of "5" would represent 50 ms. Other variations will occur to those skilled in the art upon consideration of the present teachings.

In any event, at 108 the random number R (between 0 and 1 for this example) is multiplied by S and B to obtain a random number N of time increments S that are awaited prior to execution of the operation. This can be readily accomplished in a loop wherein N is incremented by −1 at 112 and the value of N is checked at 116. If the value is not yet zero at 116, the process waits for another increment of time at 120 and control returns to 112 where N is decremented again. Once N reaches zero, the function is executed.

Figure 2:
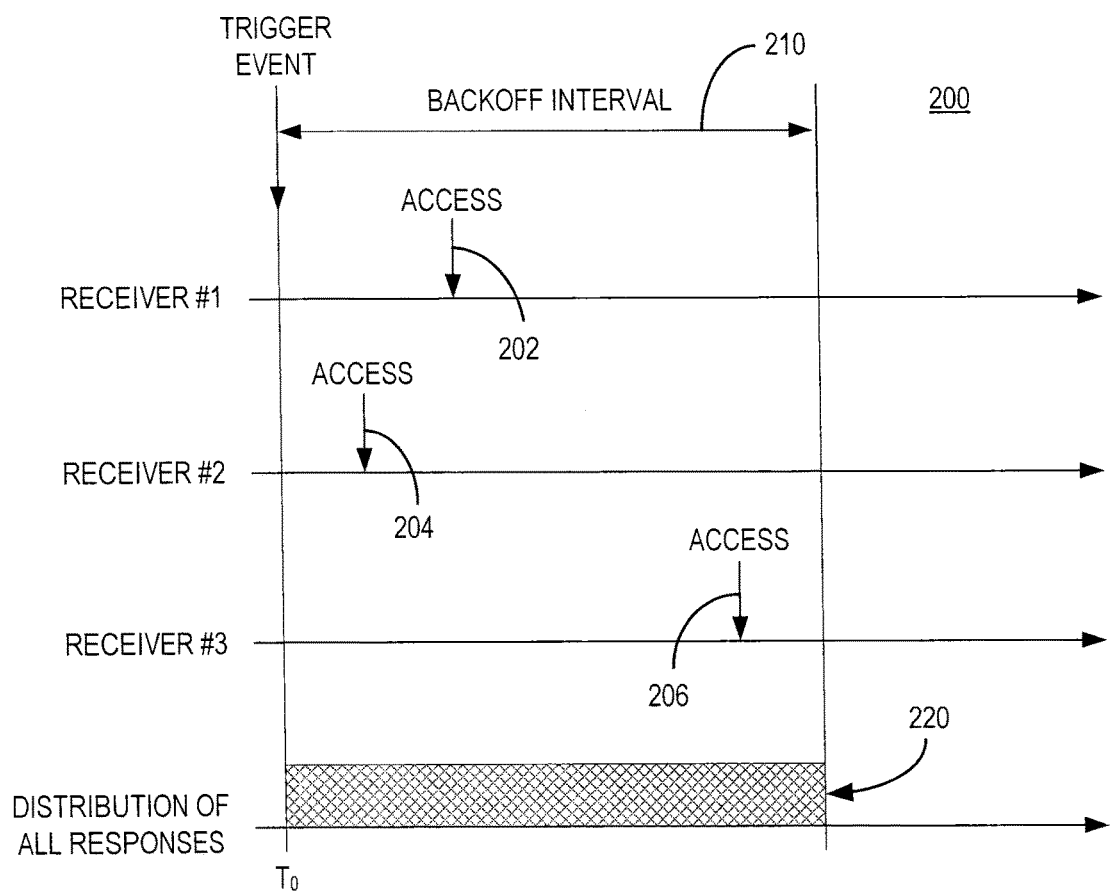
FIG. 2 is an example depiction of random execution times for three receivers that access the Internet during a backoff interval in a manner consistent with certain embodiments of the present invention.

FIG. 2 shows an example 200 of timelines of three different receivers, and their response to a Trigger Event with a backoff interval 210 as indicated by arrows 202, 204 and 206 respectively. Each of the three receiver devices responds within the backoff interval 210 at a different randomized instant of time. One can readily see that this extrapolates into a smoothing of demand for services or response of a server over a period of time so as not to unduly burden the server at any given time. The distribution of responses over a large population of receivers is approximately uniform as depicted by 220. The server in question can be either a digital television transmission system server that is carrying data to the receivers, or an Internet site server that is responsive to an operation carried out in the digital television receiver device.

Figure 3:
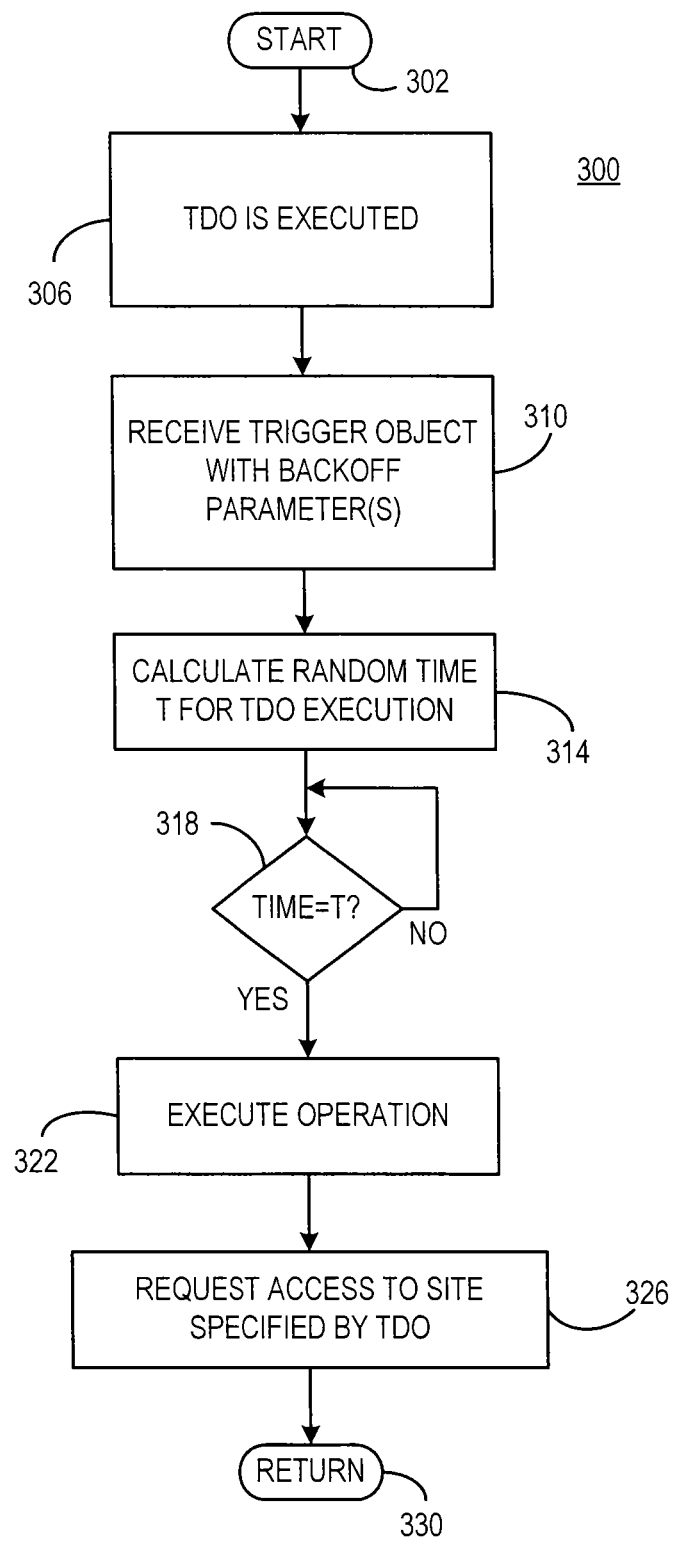
FIG. 3 is an example of a flow chart depicting a process carried out in a digital television receiver device for execution of a TDO at a randomized trigger time in a manner consistent with certain embodiments of the present invention.

An example of an overall process 300 of FIG. 3 consistent with certain implementations depicts the digital receiver device operation starting at 302 after which the receiver executes at 306 a TDO which has been received from the broadcaster or other service provider. At 310, a trigger object is received from the broadcaster or other service provider as a data structure containing one or more backoff parameters (depending on the mechanism used for defining the backoff window). A representation of a random time delay T within the backoff window is computed by the digital television receiver device's processor at 314 to determine when the trigger will enable the TDO. The time is then counted off at 318, for example in the manner depicted in FIG. 1 until the backoff time has been reached. At this point the processor is triggered to execute the operation at 322. In general, when the TDO is executed it may involve calling on remote resources (since it is desired to randomize the time of access of such resources). So, when the operation is executed at 322, it generally begins access to a remote resource such as making a call to a URL or other resource specified by the TDO at 326. The process then returns at 330.

Thus, a device consistent with certain implementations has a television receiver that receives and stores a triggered declarative object (TDO) that carries out a programmed routine when the TDO is activated. The receiver further receives a trigger object associated with the TDO. The receiver further receives a back-off parameter that represents a time interval during which the trigger is to initiate an operation. T digital television receiver device includes a programmed processor that establishes a random time within the time interval of the backoff parameter in which the TDO is activated, where the digital television receiver device processor executes the TDO at the random time.

In certain implementations, the back-off parameter is delivered as a part of the trigger object. In certain implementations, the back-off parameter is delivered as a part of the TDO. In certain implementations, the number of time periods of delay is specified as a backoff parameter. In certain implementations, the random time is calculated by the digital television receiver device processor using a random number generator. In certain implementations, the random time is calculated in accord with a script within the TDO. In certain implementations, the random time is calculated using a random number generator process carried out by the processor, where the random number generator is seeded by a parameter of the digital television receiver device to calculate a random delay time specified by an integer that represents a specified number of time periods of delay. In certain implementations, the parameter of the digital television receiver device comprises at least a portion of at least one of a MAC address, an IP address, and a serial number. In certain implementations, the back-off parameter is represented in a two part format with a first field representing a unit of time and one field representing a number of the units of time. In certain implementations, the digital television receiver In certain implementations, the Internet is accessed at an address specified in the TDO when the TDO is executed. In certain implementations, the backoff parameter is an M bit unsigned integer that expresses the time interval as a number of time periods.

Another device consistent with certain implementations has a television receiver that receives and stores a triggered declarative object (TDO) that carries out a programmed routine when the TDO is activated. The receiver further receives a trigger object associated with the TDO, the trigger object including a back-off parameter that represents a time interval during which the trigger is to initiate an operation. The backoff parameter is expressed as an integer number of time periods and a coded duration of each time period. The digital television receiver device has a processor that establishes a random time within the time interval of the backoff parameter in which the TDO is activated, where the random time is calculated using a random number generator seeded by a parameter of the digital television receiver. The parameter of the digital television receiver device comprises at least a portion of at least one of a MAC address, an IP address, and a serial number. The digital television receiver device processor executes the TDO at the random time where the executing includes accessing the Internet at the random time at an address specified by the TDO.

Figure 4:
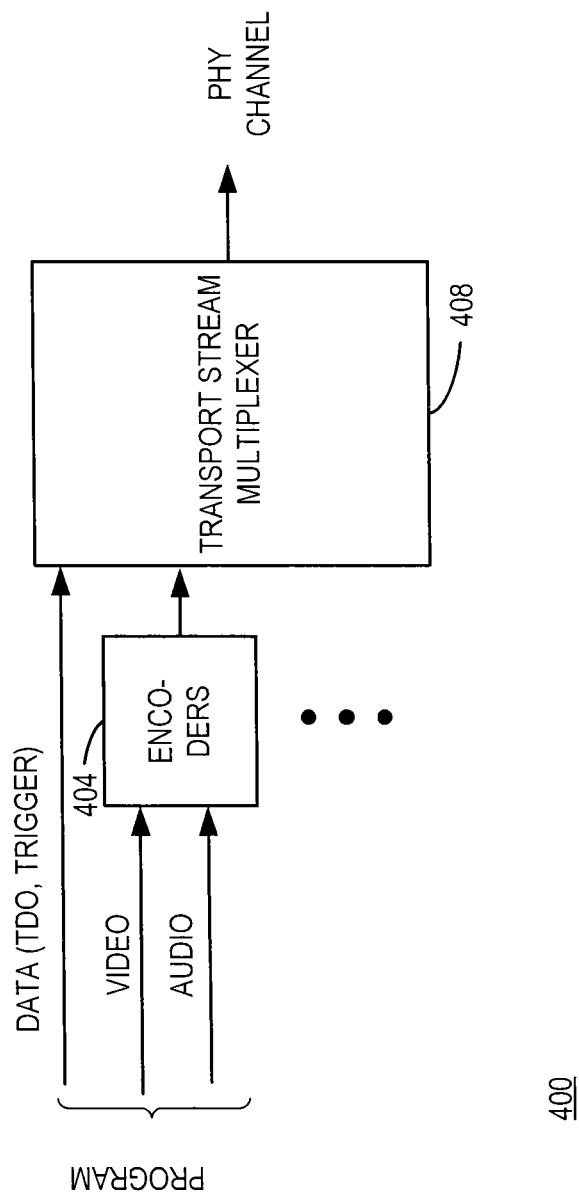
FIG. 4 is an example block diagram of a service provider that depicts assembly of a transport stream in a manner consistent with certain embodiments of the present invention.

Referring now to FIG. 4, a basic diagram of an example service provider such as a broadcaster is depicted as 400. Generally speaking, a single service provider may provide multiple programs over one or more transport streams. The audio, video, caption data, etc. are provided to an encoder which encodes the data into packets suitable for distribution. The audio and video program material is encoded by audio and video encoders 404 which are then provided to a transport stream multiplexer 408 which then provides an output that can be distributed via a physical channel medium such as cable or satellite broadcast. In this discussion, the use of the term "Program" is generally consistent with that of the MPEG-2 Systems standard (ISO/IEC 13818-1). An MPEG-2 Program includes associated Elementary Stream components, such as for example one video Elementary Stream and one or more audio Elementary Streams. In accord with the implementation described above, the TDO data and its associated trigger data are also provided to the transport stream multiplexer for incorporation into the transport stream using any suitable coding. Multiple such program streams may be provided for and encoded and multiplexed into the transport stream at 408.

Figure 5:
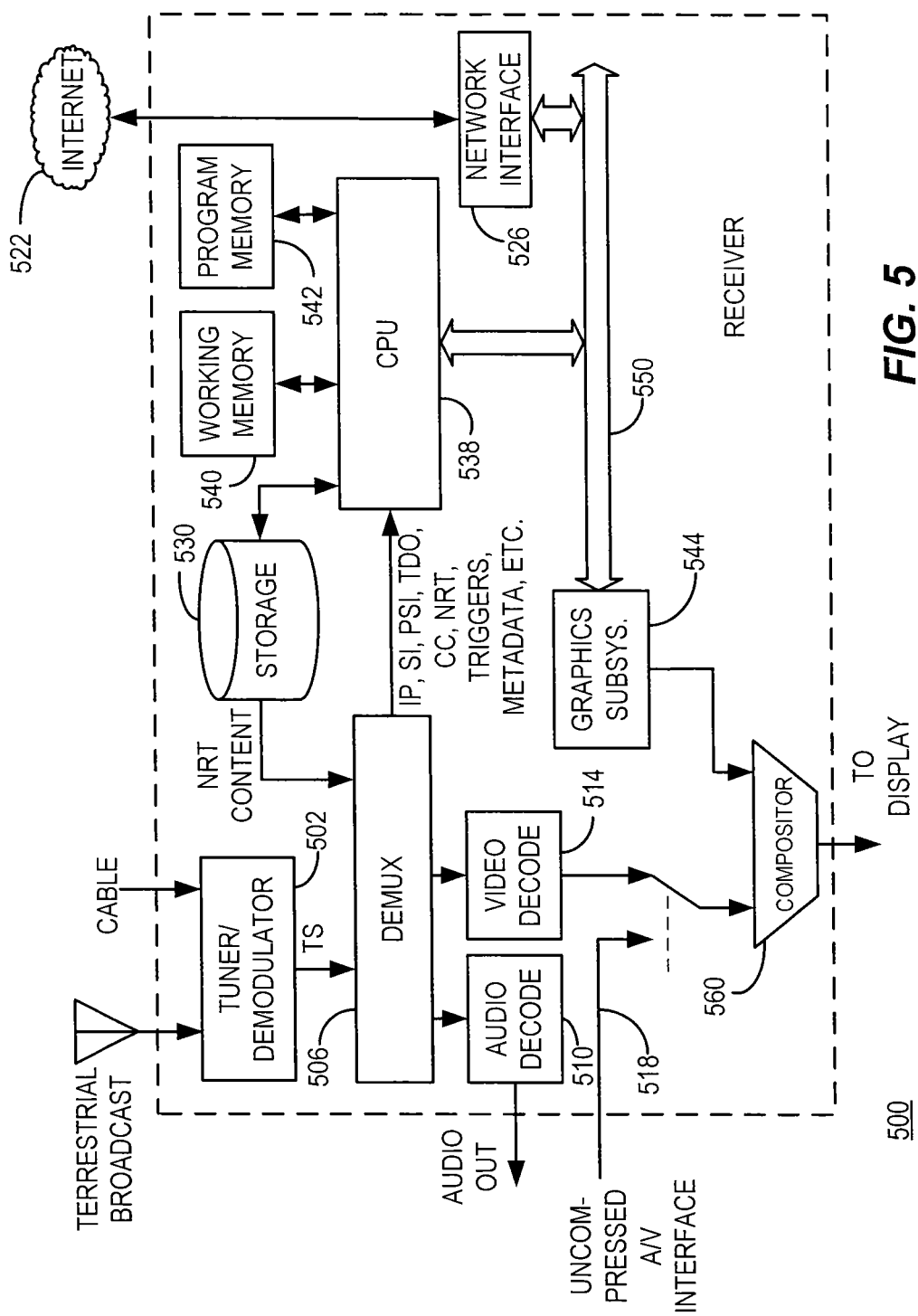
FIG. 5 is an example block diagram of a digital television receiver device consistent with certain embodiments of the present invention.

A receiver device is depicted as receiver 500 in FIG. 5 wherein content is received via any suitable source such as terrestrial broadcast, cable or satellite at a receiver 500's tuner/demodulator 502. The transport stream including caption data, TDOs, triggers, etc. from the tuner/demodulator 502 is demultiplexed at demultiplexer 506 into audio and video streams. The audio is decoded at an audio decoder 510 while the video is decoded at a video decoder 514. Uncompressed A/V data may also be received via an uncompressed A/V interface 518 that can be selectively utilized.

A/V or other content such as elements in support of the interactive TV experience may also be received via the Internet 522 via a network interface 526. Additionally, storage 530 can be provided for storage of downloaded objects such as TDOS, or A/V files such as non-real-time (NRT) content. The NRT content can be played by demultiplexing at 506 in a manner similar to that of other sources of content. The receiver generally operates under control of a processor such as CPU 538 which is interconnected to working memory 540 and program memory 542 as well as a graphics subsystem 544 via one or more buses such as 550.

The CPU 538 receives TDO and trigger data from the demultiplexer 506 as well as any other information such as electronic programming guides used for rendering graphic content and passes the information to the graphics subsystem 544 and the images are composited at the compositor and video interface 560 to produce an output suitable for display on a video display.

The CPU 538 operates to carry out various processes within the context of the subject matter disclosed herein including calculation of random numbers and operations such as making a call to a URL specified by the TDO or trigger. CPU 538 further operates to execute the scripts contained in the TDO and/or its trigger(s) and support the required rendering operations.

Figure 6:
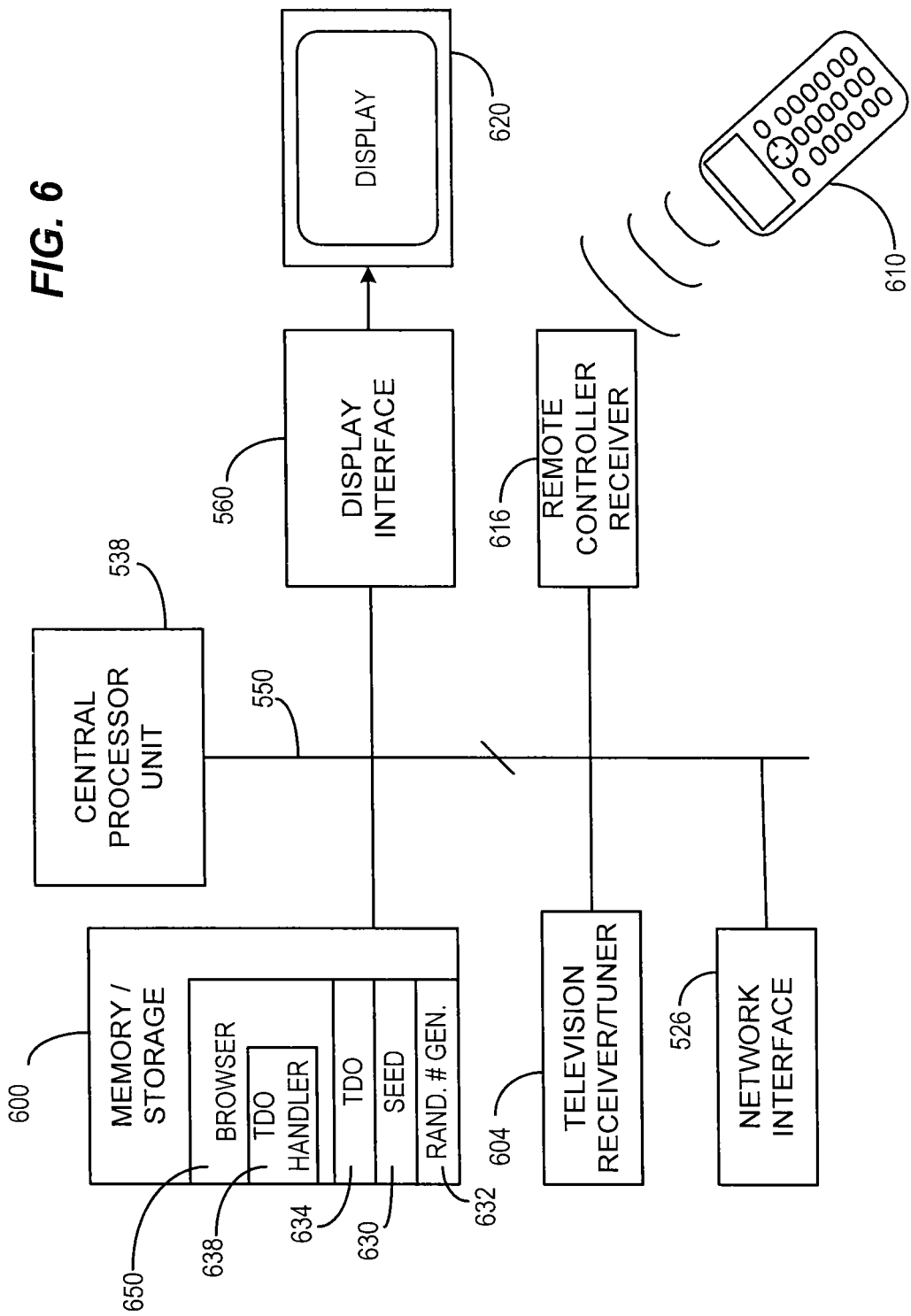
FIG. 6 is an example block diagram of a digital television receiver device processor depicting the program modules used in processing TDOs and triggers in a manner consistent with certain embodiments of the present invention.

The operation in processing TDOs is depicted in a more processor-centric view in FIG. 6. Memory and storage 530, 540 and 542 are depicted collectively as 600 in FIG. 6 for convenience. Similarly, the various demodulators, decoders, etc. that initially process digital television signals are collectively depicted as 604. The television receiver device of FIG. 6 is further depicted as having a remote controller 610 which communicates with a remote controller interface 616. Additionally, the display 620 is depicted explicitly for completeness and may represent either an integral display as in a television set or a connected display device.

Memory 600 contains various functional program modules and data. The seed data may for example be a portion of or an entire IP address, MAC address or serial number or any combination thereof for the television receiver device which is used as a seed 630 for a random number generator module or process 632 which can be used in the manner discussed above to generate a random number used to calculate the trigger delay time as discussed above.

When a TDO object is received, the TDO 634 is stored at memory 600 until triggered and executed on CPU 538. This TDO storage and execution is carried out at TDO handler 638 which may be integral to a browser 650. Moreover, the TDO, when executed upon triggering may call on the browser to access a site on the Internet via the network interface 526 as previously discussed.

Thus, a method consistent with certain implementations involves receiving a triggered declarative object (TDO) at a digital television receiver device that carries out a programmed routine when activated; receiving a trigger object associated with the TDO to the digital television receiver device, the trigger object including a back-off parameter that represents a time interval during which the trigger is to initiate an operation; where the backoff parameter is expressed as an integral number of time periods and a coded duration of the time periods; the digital television receiver device having a processor that establishes a random time within the time interval of the backoff parameter in which the TDO is activated, where the random time is calculated using a random number generator seeded by a parameter of the digital television receiver; where the parameter of the digital television receiver device comprises at least a portion of at least one of a MAC address, an IP address, and a serial number; and the digital television receiver device processor executing the operation at the random time where the executing includes accessing the Internet at the random time at an address specified by the TDO.

Another method consistent with certain implementations involves receiving a triggered declarative object (TDO) to a digital television receiver device that carries out a programmed routine when activated; receiving a trigger object associated with the TDO to the digital television receiver device; receiving a back-off parameter that represents a time interval during which the trigger is to initiate an operation; the digital television receiver device having a processor that establishes a random time within the time interval of the backoff parameter in which the TDO is activated; and the digital television receiver device processor initiating the operation at the random time.

In certain implementations, the back-off parameter is delivered as a part of the trigger object. In certain implementations, the back-off parameter is delivered as a part of the TDO. In certain implementations, the random time is calculated by the digital television receiver device processor using a random number generator. In certain implementations, the random time is calculated in accord with a script within the TDO. In certain implementations, the random time is calculated using a random number generator seeded by a parameter of the digital television receiver device to calculate a random delay time specified by an integer number of bits that represent a specified number of time periods of delay. In certain implementations, the number of time periods of delay is specified as a backoff parameter. In certain implementations, the parameter of the digital television receiver device comprises at least a portion of at least one of a MAC address, an IP address, and a serial number. In certain implementations, the back-off parameter is represented in a two part format with a first field representing a unit of time and one field representing a number of the units of time. In certain implementations, the Internet is accessed at the random time. In certain implementations, the Internet is accessed at an address specified in the TDO when the TDO is executed. In certain implementations, the back-off parameter is an M bit unsigned integer that expresses the time interval as an integer number of time periods.

A computer readable storage device such as a non-transitory computer readable storage medium can instructions which, when executed on one or more programmed processors, carry out any of the above methods Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method, comprising:
   receiving, at a digital television receiver device, an application;
   receiving, at the digital television receiver device, a back-off parameter indicating a length of time, beginning after a time of receipt of a trigger associated with the application, within which the digital television receiver device is to initiate an operation of the application;
   after receiving the application, receiving, at the digital television receiver device from a service provider, the trigger associated with the application;
   calculating, in the digital television receiver device, a random time point within an interval of time beginning after the time of receipt of the trigger, the interval of time having the length of time indicated by the back-off parameter, and
   initiating, in the digital television receiver device; the operation of the application at the random time point.

2. The method according to claim 1, wherein the operation includes accessing an external network.

3. The method of claim 2, wherein the operation includes accessing the external network at an address identified in at least one of the trigger and the application.

4. The method according to claim 2, wherein the external network is accessed to obtain content for output by the digital television receiver device.

5. The method according to claim 1, where the back-off parameter expresses the length of time as an integer number of seconds.

6. A non-transitory computer readable storage medium storing instructions which, when executed on one or more programmed processors, carry out a method according to claim 1.

7. The method according to claim 1, further comprising:
calculating the random time point using a random number generator seeded by a parameter of the digital television receiver device to calculate a random delay time specified by an integer number of time periods of delay.

8. The method according to claim 1, wherein the application is received from a service provider.

9. The method according to claim 1, wherein the back-off parameter is received with at least one of the application and the trigger.

10. An apparatus, comprising:
a digital television receiver device that is configured to
receive an application,
receive a back-off parameter indicating a length of time, beginning after a time of receipt of a trigger associated with the application, within which the digital television receiver device is to initiate an operation of the application,
after receiving the application, receive, at the digital television receiver device from a service provider, the trigger associated with the application;
calculate a random time point within an interval of time beginning after the time of receipt of the trigger, the interval of time having the length of time indicated by the back-off parameter, and
initiate the operation of the application at the random time point.

11. The apparatus according to claim 10, where the digital television receiver device includes a network connection and the operation includes accessing an external network.

12. The apparatus according to claim 11, wherein the external network is accessed to obtain content for output by the digital television receiver device.

13. The apparatus according to claim 11, wherein the external network is accessed at an address identified in at least one of the trigger and the application received by the digital television receiver device.

14. The apparatus according to claim 10, where the back-off parameter expresses the length of time as an integer number of seconds.

15. The apparatus according to claim 10, wherein the digital television receiver device comprises a random number generator seeded by a parameter of the digital television receiver device for calculating the random time point using a random delay time specified by an integer number of time periods of delay.

16. The apparatus according to claim 10, wherein the back-off parameter is received with at least one of the application and the trigger.

* * * * *